United States Patent
Jones

(10) Patent No.: US 6,629,896 B2
(45) Date of Patent: Oct. 7, 2003

(54) NIMBLE VIRTUAL REALITY CAPSULE USING ROTATABLE DRIVE ASSEMBLY

(76) Inventor: Steven Jones, PMB 118, 4140 Oceanside Blvd., Suite 159, Oceanside, CA (US) 92056

( * ) Notice: Subject to any disclaimer, the term of this patent is extended or adjusted under 35 U.S.C. 154(b) by 4 days.

(21) Appl. No.: 10/037,972

(22) Filed: Dec. 29, 2001

(65) Prior Publication Data

US 2003/0125119 A1 Jul. 3, 2003

(51) Int. Cl.[7] ............................................. A63G 31/16
(52) U.S. Cl. ......................... 472/60; 472/130; 434/55
(58) Field of Search ........................ 472/59, 60, 61, 472/130; 434/29, 55, 58

(56) References Cited

U.S. PATENT DOCUMENTS

| | | | |
|---|---|---|---|
| 2,344,454 A | * 3/1944 | Plotner | 434/55 |
| 3,135,057 A | 6/1964 | Nelson et al. | |
| 4,251,140 A | 2/1981 | Fogerty, Jr. | |
| 4,487,410 A | * 12/1984 | Sassak | 434/34 |
| 4,710,128 A | 12/1987 | Wachsmuth et al. | |
| 4,856,771 A | * 8/1989 | Nelson et al. | 434/34 |
| 5,052,932 A | 10/1991 | Trani | |
| 5,060,932 A | 10/1991 | Yamaguchi | |
| 5,496,220 A | 3/1996 | Engstrand | |
| 5,551,920 A | 9/1996 | Ogden et al. | |
| 5,702,307 A | 12/1997 | Moran | |
| 5,725,435 A | 3/1998 | De Castro Faria | |
| 5,759,107 A | 6/1998 | Nagel | |
| 5,860,808 A | * 1/1999 | Yoshimoto et al. | 297/473 |
| 5,980,256 A | * 11/1999 | Carmein | 434/29 |
| 6,017,276 A | 1/2000 | Elson et al. | |
| 6,113,500 A | 9/2000 | Francis et al. | |

* cited by examiner

Primary Examiner—Kien T. Nguyen

(57) ABSTRACT

A motion machine comprised of a lightweight spherical capsule (40) with locations for occupants. The capsule floats on a cushion of compressed air. Drive wheels (46) are positioned around the capsule's circumference controlling capsule pitch and roll. The drive wheels themselves are mounted in a rotatable drive assembly (49) controlling capsule yaw. The activation of drive wheels while in rotation about the capsule provides unlimited rotation of capsule in any direction.

6 Claims, 8 Drawing Sheets

NIMBLE VIRTUAL REALITY CAPSULE USING ROTATABLE DRIVE ASSEMBLY

FEDERALLY SPONSORED RESEARCH

Not Applicable

SEQUENCE LISTING OR PROGRAM

Not Applicable

BACKGROUND - FIELD OF INVENTION

This invention is a machine for controlling the motion of a spherical capsule containing one or more occupants. Possible applications include flight simulation, virtual reality, and 3D game playing.

BACKGROUND - DESCRIPTION OF PRIOR ART

U.S. Pat. No. 3,135,057 to Nelson et al. (1964) describes a spherical capsule floating on a precision fluid bearing. Capsule motion is generated by the use of electric motors attached to three large circular bearing assemblies located in the interior of the capsule. Activating a motor causes the capsule to rotate in the direction opposite of the motor's movement.

The Nelson et al. design has some drawbacks. The stated primary purpose of the Nelson et al. design is the simulation of instability during space flight. Continuous rotation of the capsule around an axis cannot be sustained. This is unfortunate because continuous rotation would probably best simulate the actual motion of a spacecraft spinning out of control.

Locating large power supplies and drive motors in the interior of the capsule undoubtedly adds heat and noise to a very confined space. The use of a precision fluid bearing to support the capsule means the dimensional tolerances of the capsule's exterior surface are critical. Finally, the three large custom bearing assemblies, each a couple meters in diameter, would most certainly be very expensive to manufacture.

U.S. Pat. No. 5,060,932 to Yamaguchi (1991) is a design that uses two concentric gimbal rings to support a spherical capsule. An individual motor controls the rotation of each ring, and ultimately the innermost capsule. An inherent problem with nested gimbal mechanisms is the accumulation of mass as each ring is layered around the central capsule.

Every individual motor in the Yamaguchi design, by itself, must be able to rotate the capsule. This mandates the use of large, powerful motors. Large motors add substantial and undesirable weight to the ring assemblies. Smaller motors might be adapted by gearing down the output. Unfortunately, geared down small motors would almost certainly result in sluggish rotational acceleration and deceleration.

U.S. Pat. No. 6,017,276 to Elson et al. (2000) describes a spherical capsule that is rotated by means of external drive components. The physics of a spherical capsule using external drive results in a machine that is more viable than nested gimbal designs. Keeping the drive mechanism separate from the capsule frees the capsule from the weight and undesirable flywheel effects of those components.

The Elson et al. design uses three rotary actuators whose axes are set orthogonal to each other. The design also specifies the use of rotary actuators that allow slippage to occur in the transverse direction. This means the actuators must simultaneously provide secure traction only in their intended driving direction, yet freely permit slippage at right angles. This is a significant task when accelerating and decelerating a capsule weighting possibly hundreds of kilograms. Rotary actuators mounted with their axes at orthogonal angles will, to a certain extent, always be fighting each other whenever the capsule is in motion. This is especially true when the movement of the capsule's surface is substantially oblique to the axes of the rotary actuators.

The Elson et al. design is an improvement over earlier designs, and accomplishes much with the separation of the capsule from the drive components. The development of a practical rotary actuator that could successfully provide transverse slippage might prove possible. However, significant advances in the design, performance, and practicality of machines in this field are realized by the Agile Capsule Motion Machine.

Objects and Advantages

Several objects and advantages of my invention are:

(a) to provide a motion machine that is nimble and highly responsive to occupant control;

(b) to provide a motion machine with unlimited freedom of rotation about three axes;

(c) to provide a motion machine that can be networked with similar machines;

(d) to provide a motion machine that maximizes the use of standard, off the shelf components;

(e) to provide a motion machine that functions reliably, and is easy to maintain;

(f) to provide a motion machine that is energy efficient.

BRIEF SUMMARY OF THE INVENTION

My invention best shown in FIG. 1A is comprised of a lightweight spherical capsule 40 with locations for one or more occupants. The capsule floats on a cushion of compressed air. Six stepper motors 48 are positioned around the horizontal circumference of the capsule. Driving simple rubber wheels 46, the stepper motors provide any combination of pitch and roll motion to the capsule with both precision and efficiency. The drive wheels and stepper motors themselves are mounted on a rotatable drive assembly 49, which provides precision yaw control for the capsule.

The activation of the stepper motors while they are in rotation about the capsule provides freedom for unlimited capsule rotation in any direction. This is accomplished without the accumulation of rotational mass and oversized motors as seen in nested gimbal designs. The circular array of simple drive wheels provides excellent traction and control of the capsule at all times. The problems of how to construct a practical transverse slippage rotary actuator are avoided.

DRAWINGS

Drawing Figures

Figure 1A:
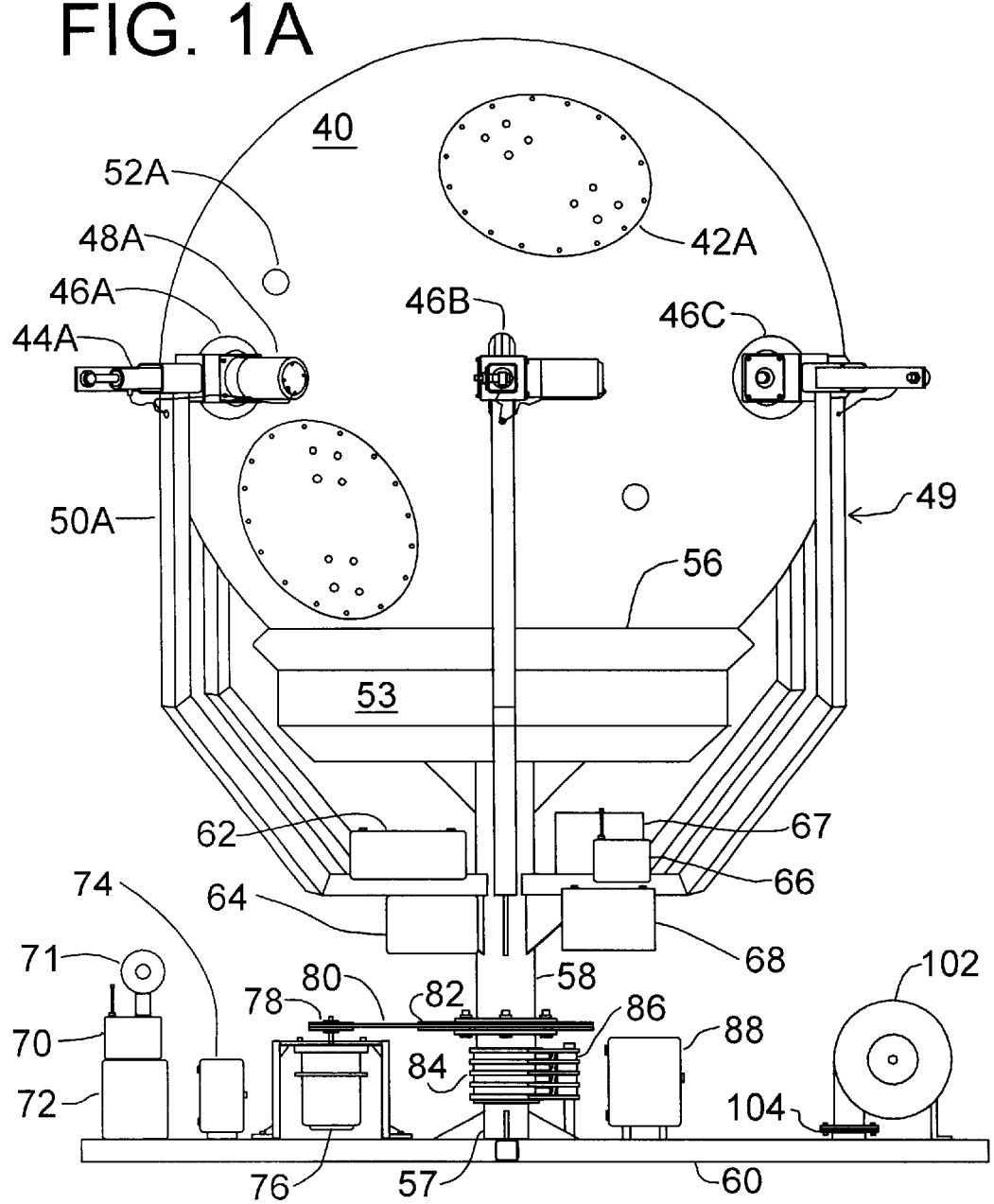
FIG. 1A shows the overall preferred embodiment including a rotatable drive assembly, using a compressed air cushion for capsule support.

Reference Numerals in Drawings
20 capsule
21 inner ring assembly
22 outer ring assembly
23 inner motor
24 middle motor
25 outer motor
28 capsule rotation motor
29 middle motor
30 yaw motor
31 external bearing ring
32 internal bearing ring
35 capsule
36 rotary actuators with transverse slippage
40 capsule
41 hatchway
42 hatch cover
44 linear actuator
45 ventilation port tube extension fan
46 drive wheel
47 water tank
48 stepper motor
49 rotatable drive assembly
50 drive support arm
51 ventilation port tube extension
52 ventilation port
53 air chamber
54 bearing support frame
55 omni-directional bearing
56 air chamber cushion
57 spindle post
58 main sleeve
59 ventilation port valve assembly
60 platform base
61 platform base- hexagonal version
62 linear actuator valve assembly
64 rotatable drive assembly air compressor
66 rotatable drive assembly radio frequency transceiver
67 rotatable drive assembly controller
68 rotatable drive assembly stepper motor power supply and controllers
70 platform radio frequency transceiver
71 platform alarm horn
72 platform control module
74 platform stepper motor power supply and controller
76 platform stepper motor
78 platform stepper motor sprocket
80 rotatable drive assembly chain
82 rotatable drive assembly sprocket
84 slip ring conductor assembly
86 brush assembly
88 platform breaker, switch, and GFI box
90 water level control tank
92 water supply connection
94 water transfer line
96 compressed air connection
98 air solenoid valve
100 air injection line
102 air cushion blower
104 air flange
105 self powered smoke detector, alarm, and transmitter
106 capsule radio frequency transceiver
108 capsule computer
110 occupant seat frame
112 battery pack
113 capsule main switch and breaker panel
114 power inverter
115 self powered air quality monitor, alarm, and transmitter
116 flat panel display
117 video camera
118 attitude encoder
120 hydraulic pump
122 hydraulic valve assembly
124 hydraulic cylinder
125 hydraulic piston
126 seat subframe
128 seat stepper motor
130 seat stepper motor sprocket
132 seat chain
133 seat screw sprocket
134 seat stepper motor power supply and controller
135 seat screw
138 alternate drive wheel
140 drive wheel sprocket
142 vertical drive chain
143 axis sprocket assembly
144 horizontal drive chain
145 stepper sprocket assembly
146 alternate mount stepper motor
151 ventilation valve
152 ventilation valve compression spring
153 ventilation valve solenoid
154 ventilation valve fan
156 linear displacement hydraulic cylinder
158 platform subframe
160 alternate orientation platform base
161 modular seat assembly
162 modular seat gantry hoist

DETAILED DESCRIPTION OF THE INVENTION

Description FIGS. 1A, 2A, 2B, 3, and 5- Preferred Embodiment

FIG. 1A shows an overall view of the preferred embodiment of the invention. Capsule 40 is approximately 2.5 meters in diameter. The main hatch 42A provides for ingress and egress for the occupant. Ventilation ports 52 permit air circulation for the occupant. The capsule 40 is supported by air chamber 53 and air chamber cushion 56. Air chamber cushion 56 is comprised of multiple layers of neoprene rolled into a toroid shape, and then covered with a durable, low abrasion fabric. Air blower 102 forces airflow through the hollow platform base 60, and up the hollow spindle post 57. Spindle post 57 is welded to platform base 60. The main sleeve 58 fits around the spindle post 57 and is lubricated with grease. The main sleeve 58 forms the base of the rotatable drive assembly 49. The airflow exits the top of the main sleeve 58 into the air chamber 53. The air chamber 53, and air cushion 56, are affixed to the main sleeve 58, and rotate with it. Whenever air blower 102 is activated, the resulting increase in air pressure in air chamber 53, causes capsule 40 to hover in light contact with air cushion 56. This allows capsule 40 to be rotated using minimal amounts of drive force. Capsule computer 108 monitors the attitude of capsule 40 using attitude encoder 118. Computer 108 uses the attitude data to close any ventilation port valve assemblies 59 that are at or below the upper edge of the air chamber cushion 56. This prevents unnecessary loss of air cushion pressure through the ventilation ports 52. Ventilation port valve assemblies 59 that are above the upper edge of air chamber cushion 56 are open by default.

Capsule 40 is rotated using two mechanisms. The first mechanism uses drive wheels 46A through 46F. These drive wheels are driven by attached stepper motors 48A through 48F. Activating these stepper motors controls capsule pitch and roll. The second mechanism is the entire rotatable drive assembly 49. Drive wheels 46A through 46F are part of this assembly, and are in contact with the capsule 40. Rotating the rotatable drive assembly 49 controls capsule yaw. Stepper motor 76 controls the rotation of rotatable drive assembly 49.

The rotatable drive assembly 49 is comprised of all parts that are directly connected to the main sleeve 58. Six actuator arms 50A through 50F radiate out from the main sleeve 58 horizontally at sixty degree intervals. On top of the actuator arms are linear actuators 44A through 44F (pneumatic cylinders) that keep drive wheels 46A through 46F in contact with capsule 40. The rotatable drive assembly air compressor 64 is used to generate air pressure for the linear actuators 44A through 44F. The output of compressor 64 is distributed through linear actuator valve assembly 62, which is controlled by the rotatable drive assembly controller 67. The control over individual linear actuators 44A through 44F permit drive wheels 46A through 46F to be disengaged from contact with the capsule 40. Contact is disengaged whenever the plane of the capsule's rotation is nearly parallel to the axis of a drive wheel. This prevents the undesirable pivoting of the drive wheels against the surface of the capsule 40. This feature eliminates squealing, and reduces wear of drive wheels 46A through 46F. A maximum of two drive wheels at any given time may need to be released from contact. This leaves four of the remaining drive wheels in normal contact, providing secure traction and control of the capsule 40.

Electrical power distribution for the platform begins at the platform breaker, switch, and GFI box 88. All 120 VAC loads are supplied using ground fault interrupter circuitry. The following loads receive power from GFI protected outlets: Platform controller 72, platform radio frequency transceiver 70, platform alarm horn 71, stepper power supply and controller 74, brush assembly 86. GFI power for blower motor 102 is controlled by a solid-state relay (not shown) controlled by Platform controller 72. Platform controller 72 also directly controls stepper power supply and controller 74, which powers stepper motor 76. Stepper motor 76 provides drive and holding power for the rotatable drive assembly 49 by way of sprockets 78 and 82, using chain 80. Brush assembly 86 receives GFI power and transfers it to slip ring assembly 84 mounted on main sleeve 58. The brush assembly conducts hot, neutral, and earth ground potentials to the slip ring assembly 84, where these are routed to rotatable drive assembly air compressor 64, rotatable drive assembly radio frequency transceiver 66, rotatable drive assembly controller 67, and rotatable drive assembly stepper motor power supply and controllers 68. Two brushes are used to conduct the earth ground potential to the slip ring assembly 84. Both the platform base 60, and the rotatable drive assembly 49, are earth grounded.

Figure 2A:
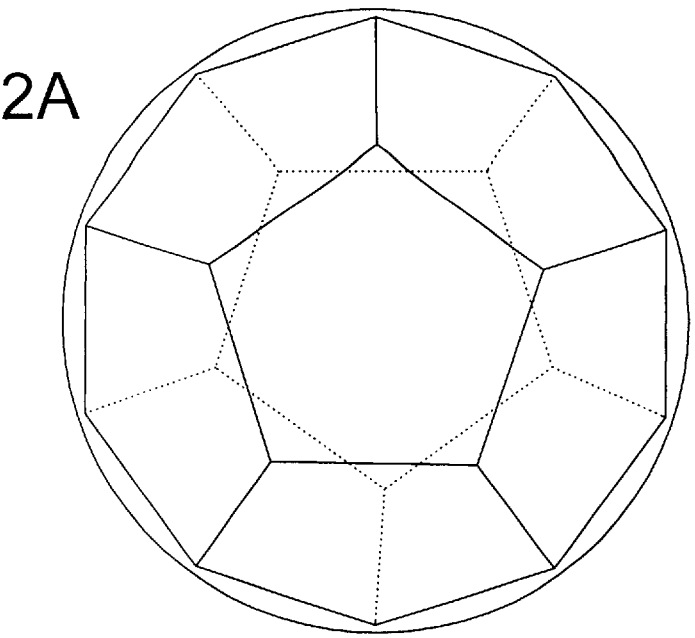
FIG. 2A shows the physical relationship between a dodecahedron and a sphere.

For best performance, capsule 40 must be lightweight and dimensionally stable. Unnecessary weight in capsule 40 decreases responsiveness. FIG. 2A illustrates the physical relationship between a dodecahedron and a sphere somewhat larger than a circumscribing sphere. A true circumscribing sphere would intersect the 20 vertices of the dodecahedron. The dodecahedron shown consists of 12 regular pentagons. The fact that a dodecahedron roughly approximates a sphere can be exploited in the construction of a capsule.

One novel method of fabricating a spherical capsule with minimum tooling involves cutting 12 polycarbonate sheets into pentagonal panels of equal size. These panels are then drilled and machined for hatchways, ventilation ports, and captive edge studs (not shown). A portion of the hardware is then pre-installed into the panels. Then Styrofoam panels are modified and glued onto the outward side of each panel. The Styrofoam is trimmed using a radius jig connected to the 5 vertices of the panel. The edges of the Styrofoam panels are then trimmed several millimeters in from the edge of the polycarbonate panels. The Styrofoam is laminated using fiberglass cloth and resin. The 12 panels are assembled into the final spherical shape by bolting edge brackets (not shown) onto the pre-installed captive edge studs (not shown).

Figure 2B:
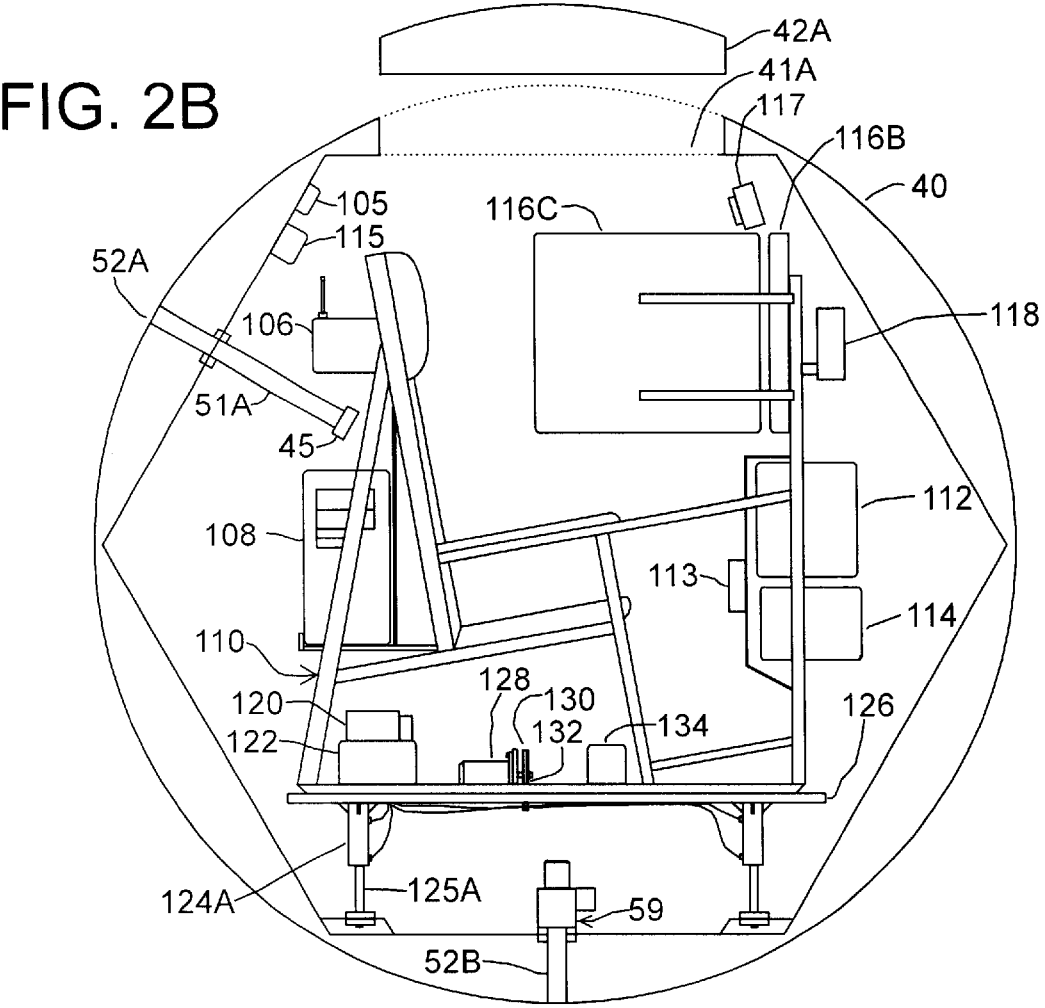
FIG. 2B shows a cross section of the capsule.

FIG. 2B shows an interior section view of capsule 40. The capsule computer 108 can adjust the position of the occupant seat frame 110 independently in both vertical and front to back directions. This provides a means to move the center of gravity of the capsule 40 near the geometric center of the sphere. This balances the capsule 40.

Figure 3:
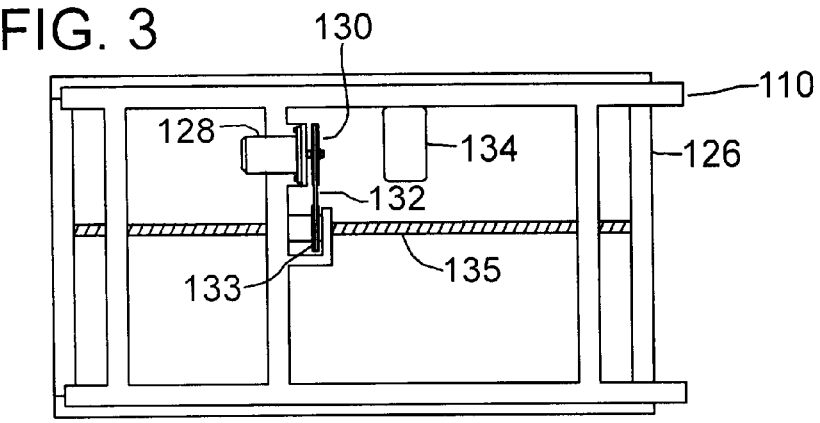
FIG. 3 shows a top view of occupant seat adjustment mechanism.

The mechanism for front to back adjustment of occupant seat frame 110 is shown by the top view in FIG. 3. Capsule computer 108 controls seat stepper motor 128 by means of seat stepper motor power supply and controller 134. Seat stepper motor 128 rotates sprocket 130, driving chain 132. Chain 132 rotates seat screw sprocket 133, which is captivated by occupant seat frame 110. Seat screw sprocket 133 is threaded on seat screw 135. Seat screw 135 is affixed to seat subframe 126. Rotating seat screw sprocket 133 adjusts occupant seat frame 110 along the axis of seat screw 135.

The mechanism for vertical adjustment of occupant seat frame 110 is shown in FIG. 2B. Four hydraulic cylinders 124A through 124D are mounted on the bottom of seat subframe 126. The four hydraulic cylinder pistons 125A through 125D are bolted to the bottom interior surface of the capsule 40. Hydraulic pump 120 provides pressurized hydraulic fluid to hydraulic valve assembly 122. Capsule computer 108 electronically controls the hydraulic valve assembly 122, thereby controlling the state of the four hydraulic cylinder pistons 125A through 125D. The amount of extension of the four hydraulic cylinder pistons 125A through 125D provides for vertical adjustment of seat subframe 126, and attached occupant seat frame 110.

In addition to the vertical adjustment of occupant seat frame 110, the four hydraulic cylinders 124A through 124D are also used to provide motion of the occupant seat frame 110 relative to the capsule 40 for additional motion effects.

The power system for the capsule 40 starts with battery pack 112. One terminal of battery pack 112 is connected to capsule main switch and breaker panel 113. This panel supplies dc current to ventilation valve fans 154, hydraulic pump 120, seat stepper motor power supply and controller 134, video camera 117, and power inverter 114. The power inverter 114 supplies 120 VAC to capsule computer 108, capsule radio frequency transceiver 106, and flat panel displays 116A through 116C.

The occupant normally enters and exits through hatchway 41A, which is directly above the occupant seat frame 110. Not shown in the drawings is the external access scaffolding. Alternate hatch covers 42B and 42C are accessible either by the occupants, or by the external safety crew for emergency exit if the capsule 40 comes to rest in an attitude that renders hatchway 41A unusable. Hatch cover 42A is normally opened and closed by the occupant operating latches (not shown) on the inside surface of the hatch cover. The external safety crew can remove a hatch cover 42 in an emergency. This is done by unscrewing the nuts around the perimeter of hatch cover 42, and pulling hatch cover 42 outward.

Figure 5:
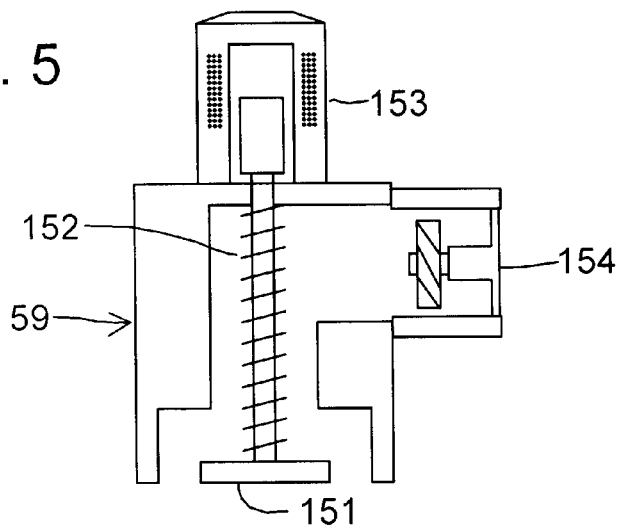
FIG. 5 shows a solenoid controlled ventilation valve.

The capsule 40 has eight ventilation ports 52A through 52H. Four of the ventilation ports have ventilation valve fans 154 drawing air into the capsule 40. Four have ventilation valve fans 154 pushing internal air out. The ventilation ports are arranged so that at least two intake, and two exhaust fans, are always well above the air chamber cushion 56, regardless of the attitude of capsule 40. This is necessary due to the fact that ventilation valves 151 will normally be closed when at, or below the vertical level of the air chamber cushion 56. FIG. 5 shows a cross section of the ventilation port valve assembly 59. Note that ventilation valve compression spring 152 holds the valve open whenever electrical power to the ventilation valve solenoid is absent.

A self powered air quality monitor, alarm, and transmitter 115 signals the occupant, and activates platform alarm horn 71, should there be a low oxygen level, or other air quality problem. Similarly, a self powered smoke detector, alarm, and transmitter 105 signals the occupant, and activates platform alarm horn 71, should there be smoke detected. Capsule 40 must never be occupied unless there is a reliable and responsible external safety crew on duty. Access to capsule 40 by unaccompanied minors or unauthorized persons must be prevented at all times by physical barriers, locks, and other security means. Capsule interior items not shown in drawings include emergency breathing apparatus, fire extinguisher, battery-powered backup lighting, air-sickness bag, and panic/stop button.

The occupant is held in position using a 5-point harness (not shown). Video camera 117 is focused on the occupant's face. A wireless video link transmits the output of video camera 117 to a monitor (not shown) viewed by the external safety crew. An audio radio link (not shown) is maintained between the occupant and the external safety crew. The external safety crew continuously monitors the occupant's condition by video and voice contact. Not shown are the capsule's audio system and speakers. Audio generated by the external safety crew always takes precedence over virtual audio generated by capsule computer 108.

Operation- Preferred Embodiment

Once hatch cover 42A is closed, and the occupant is securely strapped into seat frame 110, capsule computer 108 is activated. The status of all safety and alarm systems are checked. If both the occupant and the external safety crew concur, a motion application can be run.

The desired application is launched on capsule computer 108. Computer 108 gets the current capsule attitude from the attitude encoder 118. Computer 108 then generates a synthetic world environment and displays it on flat panel displays 116A through 116C. The capsule computer begins monitoring occupant controls such as a joystick and foot pedals (not shown). When a change is detected that requires movement of the capsule, computer 108 transmits motion commands through capsule radio frequency transceiver 106. These commands are received by both the platform radio frequency transceiver 70, and rotatable drive assembly radio frequency transceiver 66. Commands intended for the platform stepper motor 76 are processed by platform control module 72. Commands intended for the drive wheel stepper motors 48A through 48F, are processed by the rotatable drive assembly controller 67. The change of capsule attitude is monitored using attitude encoder 118. As capsule 40 rotates, computer 108 updates the display of the synthetic world environment to match the capsule's motion. This control process is repeated continuously while the occupant interacts, and travels through the synthetic environment. The safety crew continues to monitor the occupant, and the system, until the occupant has exited the capsule, and the system is shut down.

Alternative Embodiment- Water Supported Capsule

Figure 1B:
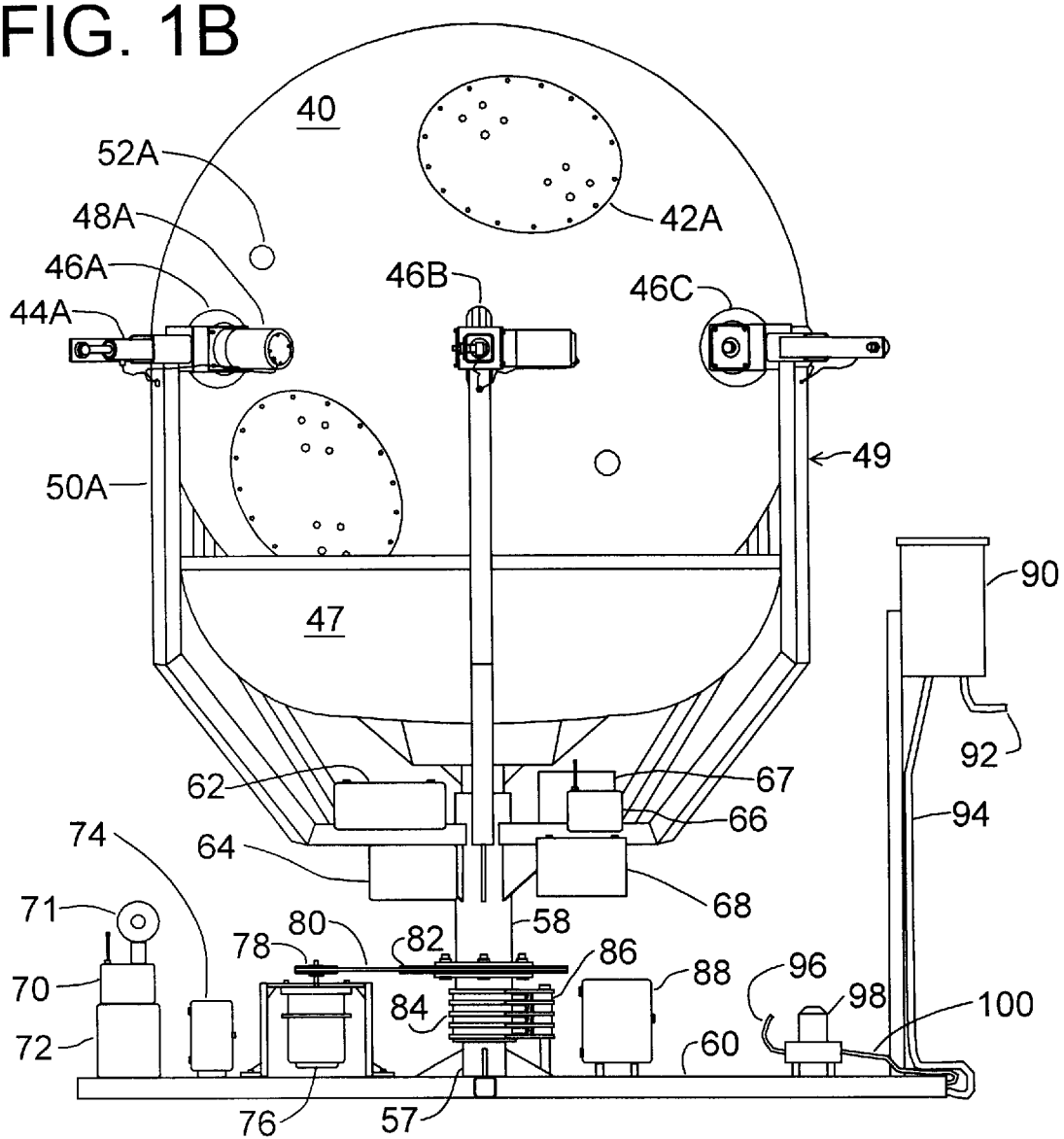
FIG. 1B shows the machine including a rotatable drive assembly, using water for capsule support.

FIG. 1B shows the overall invention using water to support the capsule 40. The water level control tank 90 uses a simple float valve to maintain water level in the water tank 47 at a predetermined level. A water source is connected to water supply connection 92. As water in water tank 47 evaporates, or is otherwise lost, water transfer line 94 maintains the water level. The water transfer line 94 runs inside of platform base 60, up inside of hollow spindle post 57, and into water tank 47. Water tank 47 is affixed to spindle post 57, and does not rotate when the rotatable drive assembly is rotated.

Compressed air from the platform air supply (not shown) is attached to compressed air connection 96. Platform controller 72 controls air solenoid valve 98. Air injection line 100 connects the output from air solenoid valve 98 to the bottom of water tank 47. Activating air solenoid valve 98 rapidly introduces air into water tank 47. This causes a temporary vertical displacement of capsule 40 for the motion effect.

When water is used to support capsule 40, ventilation port tube extensions 51 shown in FIG. 2B, replace ventilation port valve assemblies 59 that are used with air cushion supported capsules. The tops of ventilation port tube extensions 51 are always above the water level of tank 47, regardless of the attitude of capsule 40. Ventilation port tube extension fans 45 that are setup as intake fans, do not generate enough vacuum to draw in water. Ventilation port tube extension fans 45 that are setup as exhaust fans, do not generate enough pressure to create bubbles in water tank 47.

Alternative Embodiment- Bearing Supported Capsule

Figure 1C:
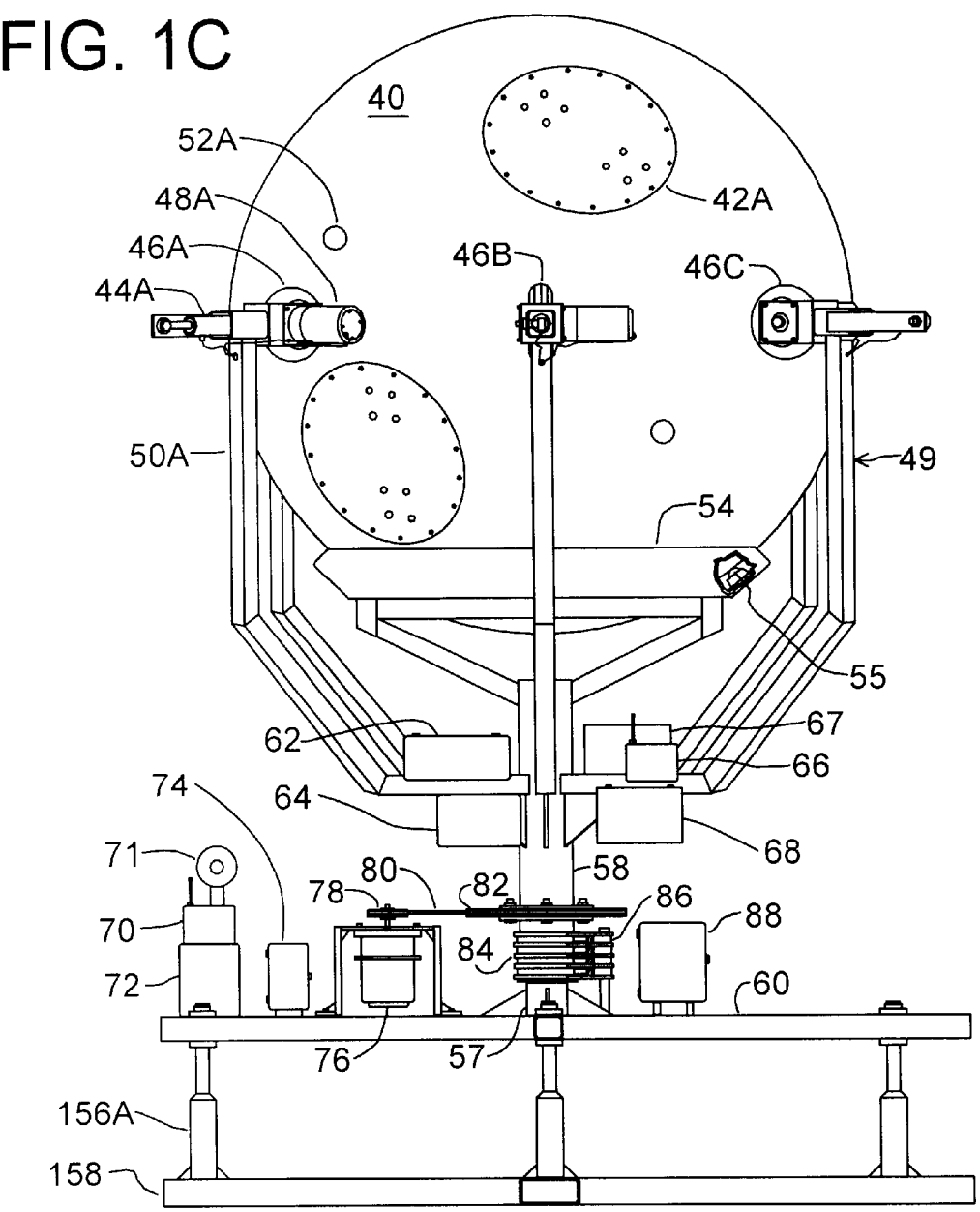
FIG. 1C shows the machine including a rotatable drive assembly, using omni-directional bearings for capsule support.
Figure 1D:
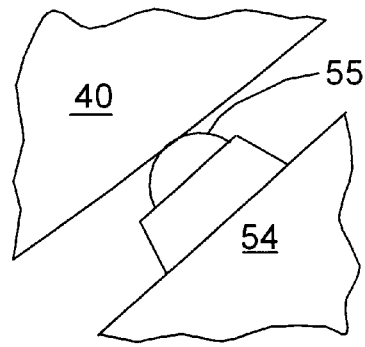
FIG. 1D shows a close up view of an omni-directional bearing.

FIG. 1C shows the overall invention using omni-directional bearings 55 mounted in a bearing support frame 54 to support capsule 40. FIG. 1D is a close up view of an omni-directional bearing 55. Bearing support frame 54 is welded to main sleeve 58, and is part of rotatable drive assembly 49.

FIG. 1C also shows an additional platform subframe 158, upon which the basic motion machine is mounted for linear motion in the vertical direction. The vertical position of platform base 60 is controlled by four hydraulic cylinders 156A through 156D. The four hydraulic cylinders are controlled by an electric powered hydraulic pump (not shown).

Alternative Embodiment- Low Motor Mount

Figure 4:
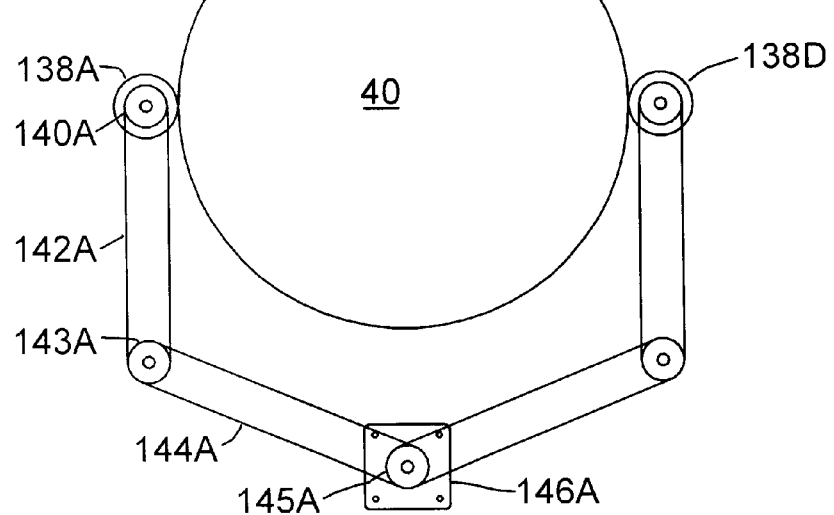
FIG. 4 shows an alternative drive arrangement with a low mounted stepper motor driving two drive wheels via drive chains.

FIG. 4 shows an alternative motor mount design. Instead of locating stepper motors 48A through 48F on top of the drive support arms 50A through 50F, each drive wheel 138 is paired up with a wheel on the opposite side of the capsule 40. The two drive wheels are linked together using drive chains and sprockets, to a single stepper motor 145 located under capsule 40. This mechanism is repeated for the other two pairs of drive wheels.

Figure 6A:
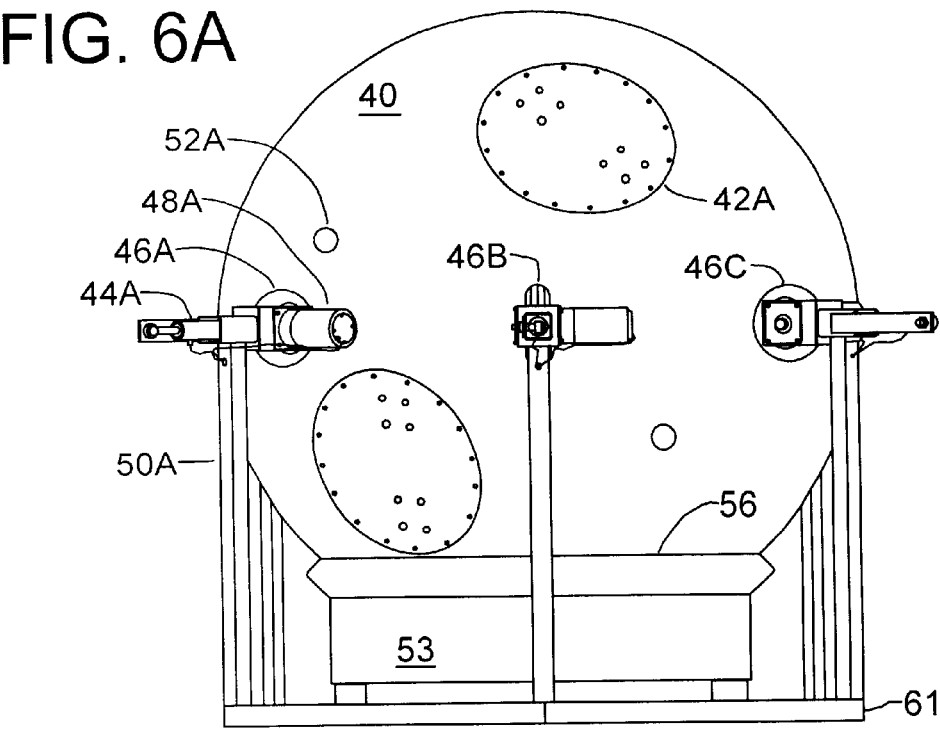
FIG. 6A shows the machine's essential framework not implementing a rotatable drive assembly, using a compressed air cushion for capsule support.
Figure 6B:
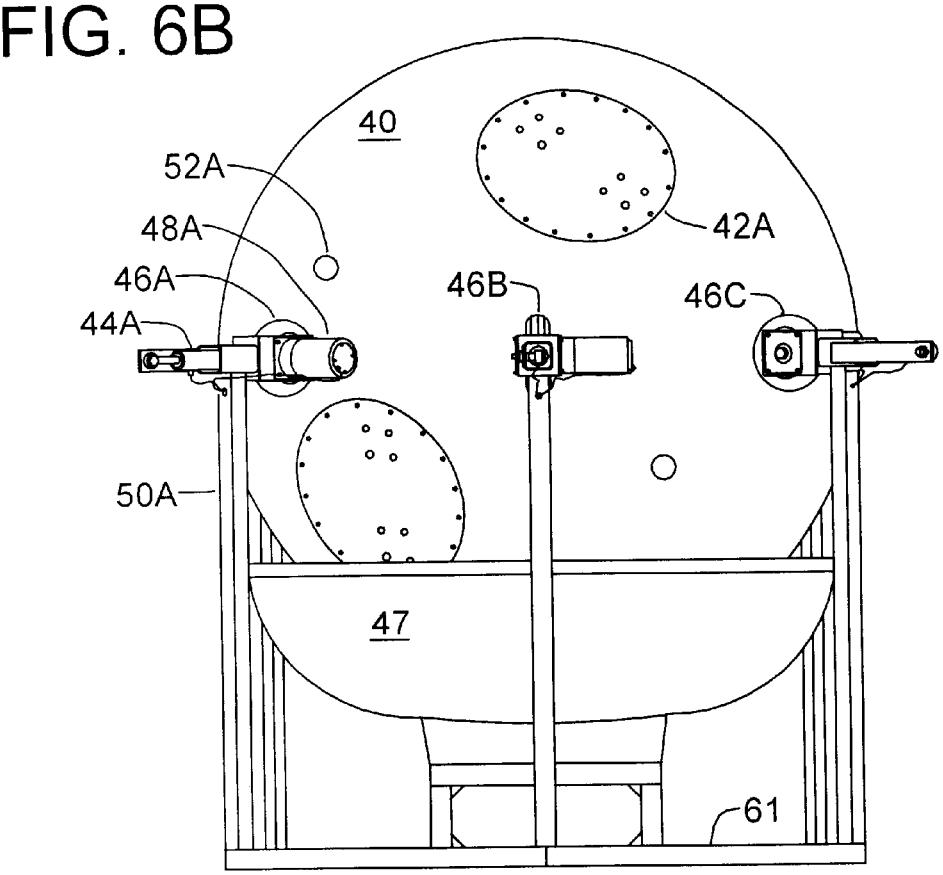
FIG. 6B shows the machine's essential framework not implementing a rotatable drive assembly, using water for capsule support.
Figure 6C:
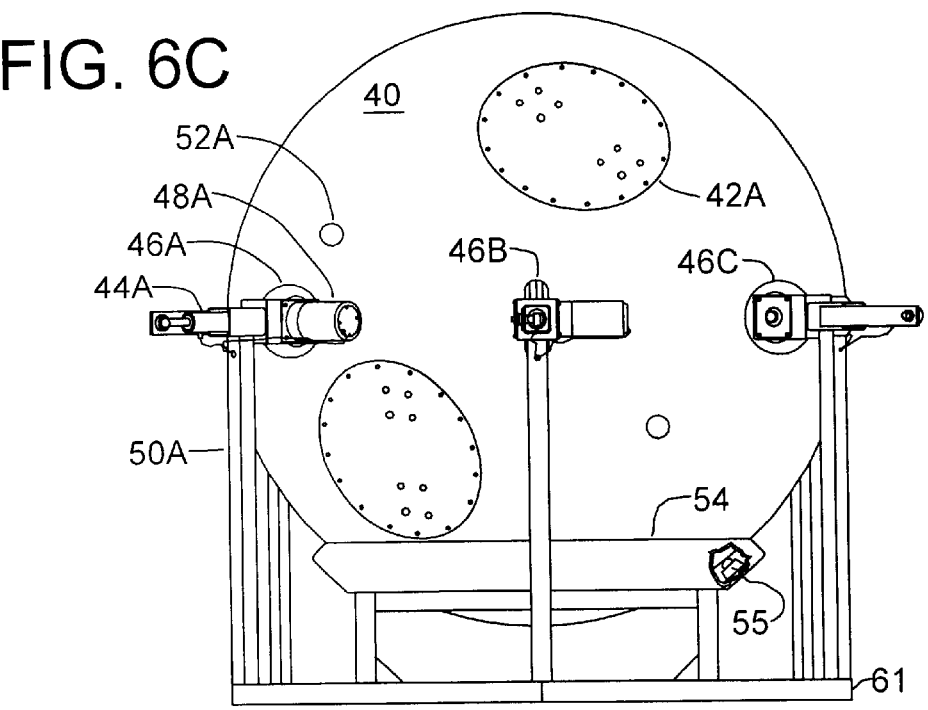
FIG. 6C shows the machine's essential framework not implementing a rotatable drive assembly, using omni-directional bearings for capsule support.
Figure 6D:
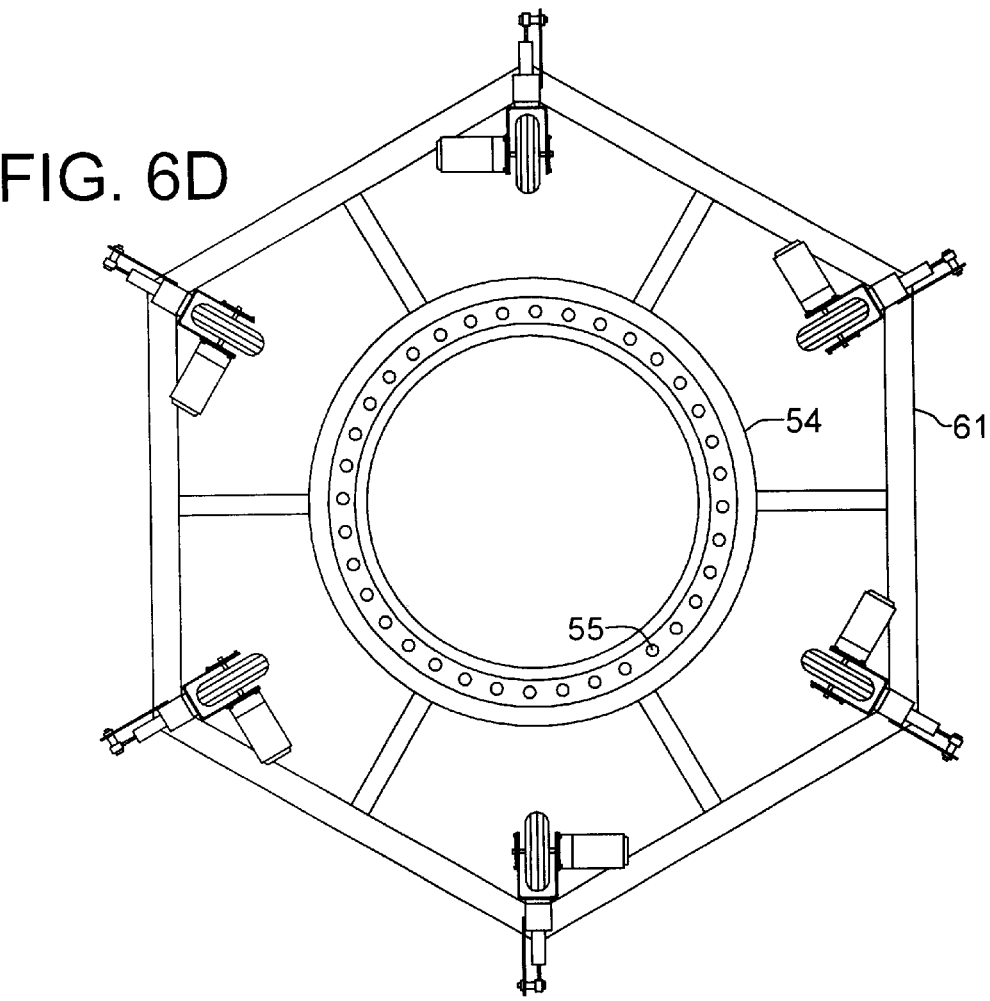
FIG. 6D shows a top view of the machine's essential framework not implementing a rotatable drive assembly, using omni-directional bearings for capsule support, with capsule removed.

Alternative Embodiment- Motion Machine not Implementing Rotatable Drive Assembly These Figures show the essential framework for versions of the machine that give up yaw rotation in exchange for a simpler design. FIG. 6A shows a capsule 40 using air chamber 53 for support. FIG. 6B shows a capsule 40 using water tank 47 for support. FIG. 6C shows a capsule 40 supported by omni-directional bearings 55. FIG. 6D is a top view of the machine shown in 9C with capsule 40 removed, showing bearing support frame 54, and a circular array of omni-directional bearings 55.

Alternative Embodiment- Alternative Rotatable Drive Assembly Orientation

Figure 7A:
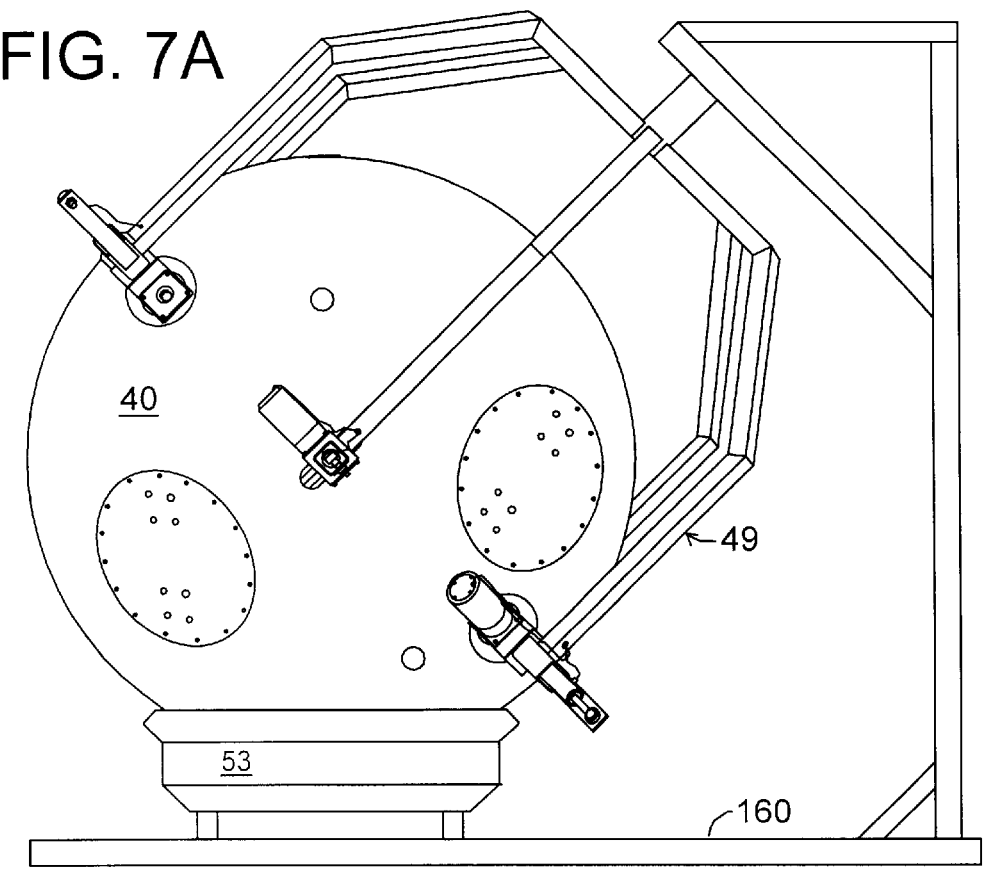
FIG. 7A shows the essential framework of an alternative rotatable drive assembly orientation permitting a low mount capsule, using a compressed air cushion for capsule support.

FIG. 7A shows the essential framework of an alternative method for mounting the rotatable drive assembly 49. The alternate orientation platform base 160 allows the capsule 40 to be located low to the ground, but retains the capability of simultaneous rotation about all three axes. A compressed air cushion supports the capsule in FIG. 7A.

Alternative- Modular Seat Assembly

Figure 7B:
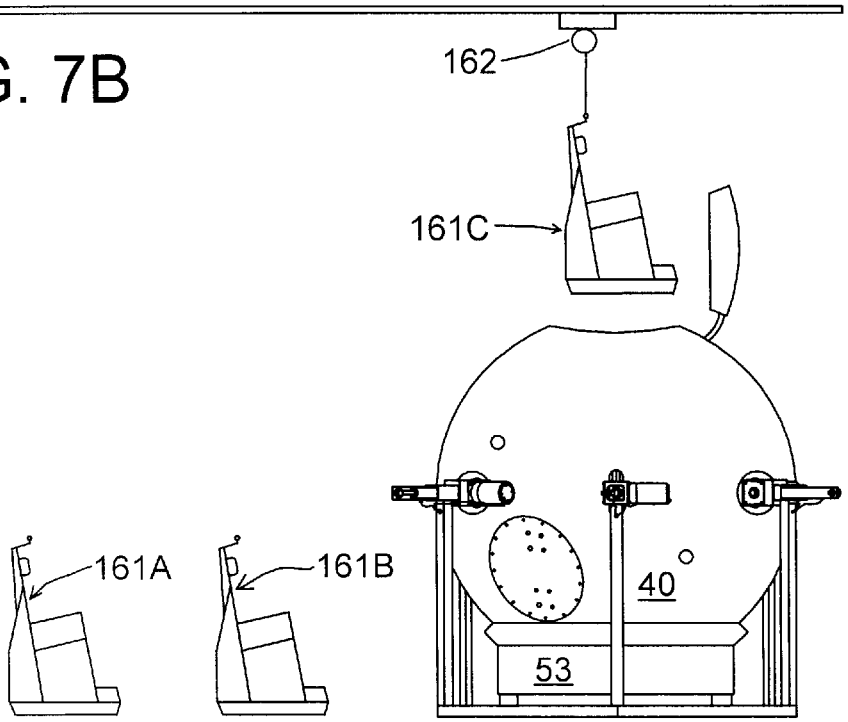
FIG. 7B shows the basics of a modular seat loading system.

FIG. 7B illustrates the basic concept of a modular seat loading and unloading system. The occupant can be placed into a modular seat assembly 161 while still safely on the ground. The seat assembly, and safely restrained occupant, are lifted by the modular seat gantry hoist 162 and lowered into the capsule 40. If the operator controls (joystick, etc.) and display panel were part of the modular seat assembly, the occupant could receive pre-ride instructions, and practice using the controls while waiting in the queue.

Conclusion, Ramifications, and Scope

My invention using a lightweight capsule with a circular array of drive wheels provides nimble and responsive motion for the occupants. Driven by multiple stepper motors, the capsule is stable without being sluggish. The linear actuators keep rubber drive wheels in secure contact with the capsule providing excellent traction and control. Whenever the capsule is rotating in a plane perpendicular to a drive wheel, the linear actuators release contact pressure, eliminating squealing and unnecessary wheel wear. Using six drive wheels guarantees that there are at least four drive wheels always in control of the sphere. If a larger capsule is desired, the number of drive wheels can be simply increased.

The rotating drive assembly provides control of capsule rotation about all three axes. The use of stepper motors means that acceleration and deceleration forces can be applied to the capsule in precise and predictable amounts. Capsule rotation is limited only by the endurance of the occupants. Adjustable positioning of the occupants within the capsule allows the capsule to be balanced. A balanced capsule allows for maximum rotational acceleration and deceleration. A balanced capsule also eliminates the use of oversized motors. Properly sized motors minimize energy consumption, and reduce costs, both in manufacturing and during operation.

My invention is highly practical, using many off the shelf components. The capsule can be supported by compressed air, water, or bearings. Simple rubber drive wheels provide secure traction and control. The design avoids the cost and difficulties associated with manufacturing a precision spherical capsule with close tolerances.

While my above description contains many specificities, these should not be construed as limitations of the scope of the invention, but rather as merely providing illustrations of several presently preferred embodiments. Accordingly, the scope of the invention should be determined not by the embodiments illustrated, but by the appended claims and their legal equivalents.

What is claimed is:

1. A motion machine comprising:

a substantially spherical capsule;

locations for one or more occupants within said capsule;

a plurality of rotary actuators located around exterior of said capsule;

axes of said rotary actuators being substantially parallel to a single plane intersecting said capsule;

said rotary actuators being a principle means of controlling rotation of said capsule substantially about two axes;

a plurality of linear actuators;

a plurality of drive support arms;

each said linear actuator connected at one end to a said rotary actuator, the other end connected to a said drive support arm;

a control system controlling said rotary actuators and said linear actuators;

said linear actuators disengage said rotary actuators from contact with said capsule.

2. The machine of claim 1, wherein said linear actuators under control of said control system adjust the amount of contact pressure of said rotary actuators against said capsule.

3. The machine of claim 1, wherein the open or closed state of one or more ventilation port valves are controlled by said control system.

4. A motion machine comprising:

a substantially spherical capsule;

locations for one or more occupants within said capsule;

a plurality of rotary actuators mounted in a rotatable drive assembly;

axes of said rotary actuators being substantially parallel to a single plane intersecting said capsule;

said rotary actuators being a principle means of controlling rotation of said capsule substantially about two axes;

rotation of said rotatable drive assembly being a principle means of controlling said rotation of said capsule about a third axis substantially orthogonal to plane of said rotatable drive assembly;

a plurality of linear actuators positioned on said rotatable drive assembly;

each said linear actuator connected at one end to a said rotary actuator, the other end connected to said rotatable drive assembly;

a control system controlling said rotary actuators, said rotatable drive assembly, and said linear actuators;

said linear actuators disengage said rotary actuators from contact with said capsule.

5. The machine of claim 4, wherein said linear actuators under control of said control system adjust the amount of contact pressure of said rotary actuators against said capsule.

6. The machine of claim 4, wherein the open or closed state of one or more ventilation port valves are controlled by said control system.

* * * * *